United States Patent [19]

West

[11] Patent Number: 4,553,326
[45] Date of Patent: Nov. 19, 1985

[54] CHAIN SAW BRAKING SYSTEM

[75] Inventor: James F. West, Rancho Palos Verdes, Calif.

[73] Assignee: McCulloch Corporation, Los Angeles, Calif.

[21] Appl. No.: 587,843

[22] Filed: Mar. 12, 1984

Related U.S. Application Data

[63] Continuation of Ser. No. 457,909, Jan. 14, 1983, abandoned, which is a continuation-in-part of Ser. No. 376,810, May 10, 1982, abandoned.

[51] Int. Cl.⁴ .................. B60T 13/04; B27B 17/02
[52] U.S. Cl. .................... 30/381; 188/77 R; 188/166
[58] Field of Search ............ 30/166 R, 181–183; 188/77 R, 77 W, 166; 192/84 VT, 103; 74/97

[56] References Cited

U.S. PATENT DOCUMENTS

| | | | |
|---|---|---|---|
| 3,810,309 | 5/1979 | Wiklund et al. | 30/382 |
| 3,934,345 | 1/1976 | Hirschkoff | 30/381 |
| 3,964,333 | 6/1976 | Hirschkoff | 30/351 |
| 4,156,477 | 5/1979 | Nagashima et al. | 30/381 |

Primary Examiner—Douglas D. Watts
Attorney, Agent, or Firm—Murray, Whisenhunt and Ferguson

[57] ABSTRACT

A chain saw safety braking assembly includes a sensing arm pivotally mounted to the housing and having a protrusion. A portion of the sensing arm is located in front of the gripping handle and is arranged to move from a first position to a second position in response to being struck by an appendage of the operator. A flexible brake band is disposed around the peripheral surface of a brake drum, and includes a first end anchored to the housing and a second end coupled to the sensing arm protrusion, such that when the sensing arm moves from the first position to the second position the flexible brake band is moved from a position free of the brake drum to a frictional braking relationship with the brake drum. A latch is rotatably mounted to the housing and is adapted to releasably engage the protrusion on the sensing arm. A spring anchored to the housing cooperates with the latch such that the latch yieldably holds the sensing arm in either the first or the second position. Thus when the sensing arm is struck, it will move from the first position to the second position stopping the chain movement. Additionally, an acceleration sensing assembly may be incorporated to sense acceleration of the saw, again typically due to kickback, and stop the chain should the acceleration rise above a preset level.

30 Claims, 9 Drawing Figures

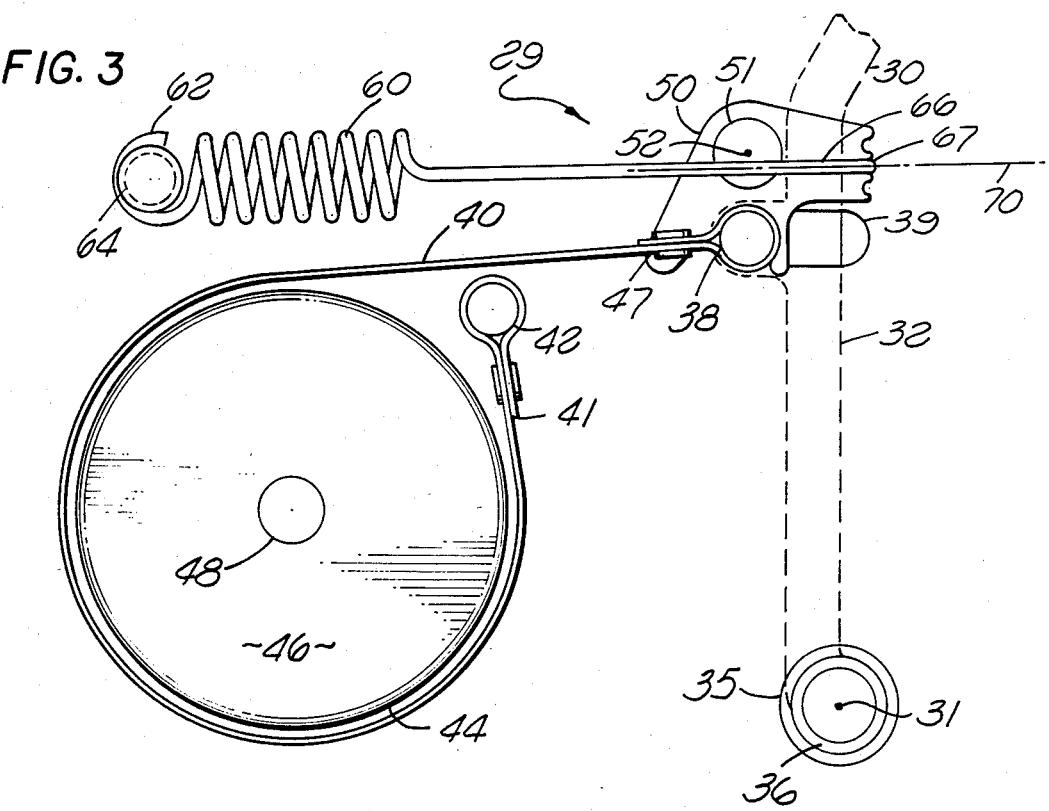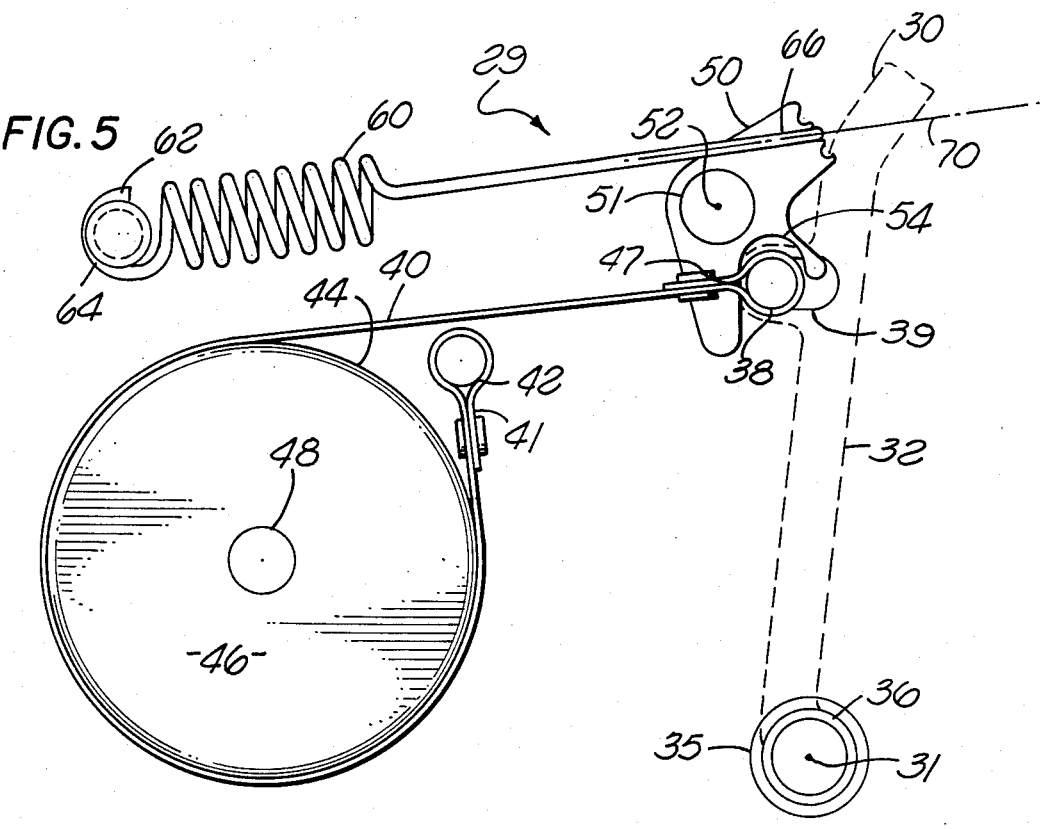

CHAIN SAW BRAKING SYSTEM

This application is a continuation, of application Ser. No. 457,909, filed Jan. 14, 1983, which now abandoned is a continuation-in-part of Application Ser. No. 376,810, filed May 10, 1982, now abandoned.

BACKGROUND OF THE INVENTION

1. Field of Invention

The invention relates to the field of chain saws and particularly to a cutting chain braking system.

2. Description of Prior Art

Manually portable chain saws typically comprise an engine-carrying housing, a cutter bar projecting forwardly from the housing, and an engine-driven cutting chain entrained for endless movement around the cutter bar. The chain saw is designed to be utilized by an operator grasping the machine with both hands. One hand of the operator normally holds a gripping handle mounted on the housing, while the other hand engages a housing control handle for actuating a trigger throttle mechanism.

In some instances of cutting operation, the cutting chain may encounter resistance of a type causing the cutter bar to kick upwardly in a manner commonly referred to as "kickback".

Generally the main method for dealing with this "kickback" phenomenon has been to incorporate a chain brake which can be actuated at the onset of "kickback", stopping the chain by means of the brake before contact with the operator.

Most chain saws incorporate a centrifugal clutch between the engine and the chain drive sprocket. A typical clutch design is illustrated in U.S. Pat. No. 2,947,411, Centrifugal Clutch Actuator and Spring Retainer by R. L. Collins, herein incorporated by reference. Since the drive sprocket is usually attached to the clutch housing, the housing typically serves as the brake drum for most braking systems.

An example of such a braking system can be found in U.S. Pat. No. 3,739,475, Chain Saw Safety Method And Apparatus by H. E. Moore. Moore provides a yoke, incorporating brake shoes pivotally mounted at each end, which is rotatably mounted to the saw housing. The brake shoes have tapered surfaces adapted to engage housing mounted lugs and thus when the yoke is rotated the brake shoes are forced into contact with the periphery of the clutch housing. The yoke is coupled to a safety bar located on the front gripping handle by means of a push rod and is spring biased to a position which retracts the brake shoes. Should the saw "kickback" and the hand or arm of the operator strike the safety bar the brake shoes are driven into the clutch drum and wedged in place stopping chain rotation.

This design has several disadvantages, one of which is that once the brake shoes are engaged they may be difficult to retract because they are wedged in place. Furthermore the braking system is relatively heavy. Another example of the use of brake shoes can be found in U.S. Pat. No. 3,793,727, Chain Saw Safety Method And Apparatus by H. E. Moore.

Subsequent designs have used flexible brake bands, i.e. U.S. Pat. No. 3,776,331, Brake-Device For Power Saws by L. Gustafsson. In this design a flexible band is loosely wrapped around the clutch drum with one end of the band attached to the housing. The opposite end is attached to one end of a lever arm which is pivotally mounted to the housing in front of the gripping handle with one end of the flexible brake band attached directly thereto. Pivotally attached to the lever is a latch adapted to engage a pin mounted in the housing. A spring mounted between the lever and housing biases the latch to the latched position and also biases the lever to the braking position. Upon movement of the lever the latch is forced past the pin and the spring continues to bias the lever to the braking position. While this design is simpler than the aforementioned designs, when the brake assembly is in the non-braking position, the spring biases the latch to the latching position and the lever to the braking position. This makes the proper selection of spring strength difficult. If the spring produces too much force it will be difficult to unlatch the safety lever and if it is too weak the braking force produced by the flexible band may not be sufficient to stop the chain as rapidly as may be desired.

Therefore it is desirable to have the spring bias the safety lever (sensing arm) in the non-braking position only when it is in the non-braking position and to only bias the lever to the braking position only when it is in that position. This ensures that there is always a positive force maintaining the desired position. This was accomplished in a design disclosed in U.S. Pat. No. 3,934,345, Snap-Acting Over Center Chain Saw Safety Brake And Method Of Operation Thereof by S. Hirschkoff. In this design a safety handle is typically mounted to the saw housing and in the actuated position holds a flexible brake band into frictional contact with the clutch drum. A guide rod is both slideably and pivotally mounted to the housing at one end and at the opposite end to a curved slot or groove. The rod is spring biased toward the safety handle. The positional relationship of the slot, rod and handle pivot point are such that in the unbraked position the thrust angle of the spring is below the pivot point of the safety handle biasing the safety handle toward the unbraked position and when the safety handle is in the braked position the thrust angle of the spring is above the pivot point biasing the safety handle toward the braked position. While this design achieves the over center latch function it is heavy and somewhat expensive to manufacture.

All the designs discussed above are actuated by an arm or hand or other appendage of the operator during kickback. However, there have been designs which have attempted to sense the angular acceleration of the chain saw upon kickback and to stop the chain without the operator having to manually move the safety lever, an example of which can be found in U.S. Pat. No. 3,923,126, Band Type Brake In A Chain Saw by E. J. Bidenset. In this design an inertia sensor in the form of a guide member and a first lever connected together are rotatably mounted in the saw housing. The first lever engages a second lever also rotatably mounted in the housing and the two are spring biased toward each other. The second lever has an arm which abuts against the end of a brake band spring biased to the braking position. In operation, when kickback occurs the inertia loads on the guide member and first lever cause them to move free of the brake band end. In another embodiment the second lever is attached directly to the end of the flexible brake band and thus rotation of the second lever directly brakes the chain.

This design is complicated and expensive to manufacture and requires a lot of care to assemble. Since the guide member is also acting as a safety bar capable of actuating the brake upon contact with the operator's hand or arm it will be difficult to set the proper triggering level. This is because the inertia due to "kickback" is going to be considerably smaller than the force applied by the operator. If the force level is indeed very low the saw will be subjected to continuous actuation of the brake by the casual touching of the guide member.

Other chain saw braking systems of interest are shown in U.S. Pat. Nos. 3,937,306, Automatic Brake Actuator For A Chain Saw by Ulf Vilhein Naslund et al; 3,964,333, Safety Braking Mechanism For A Portable Chain Saw by S. Hirschkoff; and 4,121,339, Safety Brake Mechanism For Chain Saw by M. Nikolich.

Therefore it is a primary object of this invention to provide a chain brake for a chain saw that is compact, light in weight and reliable.

Another object of this invention is to provide a chain brake for a chain saw wherein the safety bar is biased between one or the other of two positions, one being the non-braking position and the other being the braking position.

A further object of this invention is to provide a chain brake for a chain saw that requires only a small movement of the safety bar to achieve full braking effect.

A still further object of this invention is to provide a chain brake for a chain saw which provides both manual and automatic chain braking capabilities.

SUMMARY OF THE INVENTION

The invention is a safety brake assembly for a chain saw which is designed primarily to protect the operator from injury due to "Kickback". Generally, most chain saws comprise a housing means having a gripping handle mounted thereon; an engine or motor means carried by the housing; a cutting chain; a support bar means projecting forwardly from the housing means, for supporting cutting chain movement; and a rotation transmitting assembly or means for driving the cutting chain. The safety braking assembly or means of the present invention comprises a sensing arm or means pivotally mounted to the housing, the sensing arm in one embodiment having a protrusion in the form of a pin mounted thereto. A portion of the sensing arm is located in front of the gripping handle during operation of the chain saw and is arranged to be swung from a first position to a second position in response to being struck by an appendage of the operator. A flexible brake band is disposed around the peripheral surface of rotation transmitting means or brake drum, and has a first end anchored to the housing and a second end coupled to the sensing arm, preferably by means of the pin, in a manner such that when the sensing arm moves from the first position to the second position the flexible brake band is moved from a position free of the brake drum to a frictional braking relationship therewith. A latch which is rotatably mounted to the housing is adapted to engage the protrusion of the sensing bar. Biasing means (or a tension spring) is anchored at its first end to the latch, in such a manner that the latch yieldably holds the sensing arm in the first position when the sensing arm is in that position and yieldably holds the sensing arm in the second position when the sensing arm is in that position.

Thus, when the appendage of an operator strikes the sensing arm typically due to the "kickback" phenomenon, the sensing arm will move from the first position to the second position stopping chain movement prior to the cutting chain coming into contact with the operator.

Additionally, an acceleration sensing assembly or means can be incorporated as a second embodiment to sense the acceleration of the chain saw due to "kickback". Preferably the acceleration sensing assembly comprises a bar having a cam mounted thereto, the bar being pivotally mounted to the housing. The aforementioned latch is provided with a lever in disengageable contact with the cam. When "kickback" occurs the chain saw will rotate in relationship to the bar because the bar has inertia and tends to resist the acceleration. This will cause the cam to rotate the lever which in turn will cause the sensing arm to move from the first position to the second position stopping the chain.

In a third embodiment a first pin is instead mounted on the latch, and the sensing arm incorporates a different protrusion, one having a U shaped groove coupled to this first pin. The second end of the flexible brake band in this third embodiment is typically coupled to a second pin mounted on the latch.

A fourth embodiment of the present invention incorporates the above-described acceleration sensing assembly with the latch mechanism of the third embodiment.

The novel features which are believed to be characteristic of the invention, both as to its organization and its method of operation, together with further objects and advantages thereof will be better understood from the following description in connection with the accompanying drawings in which presently preferred embodiments of the invention are illustrated by way of examples. It is to be expressly understood, however, that the drawings are for purposes of illustration and description only, and are not intended as a definition of the limits of the invention.

BRIEF DESCRIPTION OF THE DRAWINGS

Illustrated in FIG. 1 is a side elevation view of a portion of a chain saw in accordance with the present invention;

Illustrated in FIG. 2 is a front view of the chain saw shown in FIG. 1;

Figure 1:
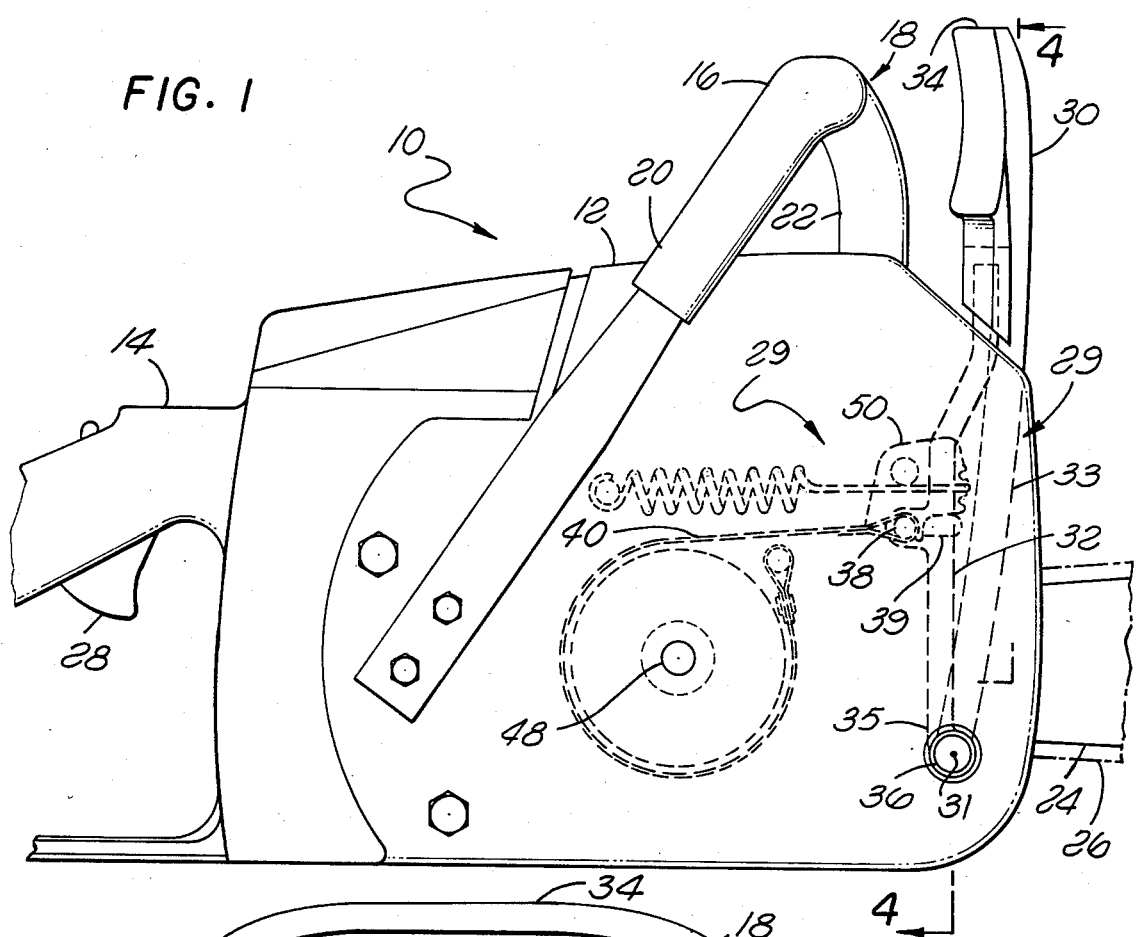
Figure 4:
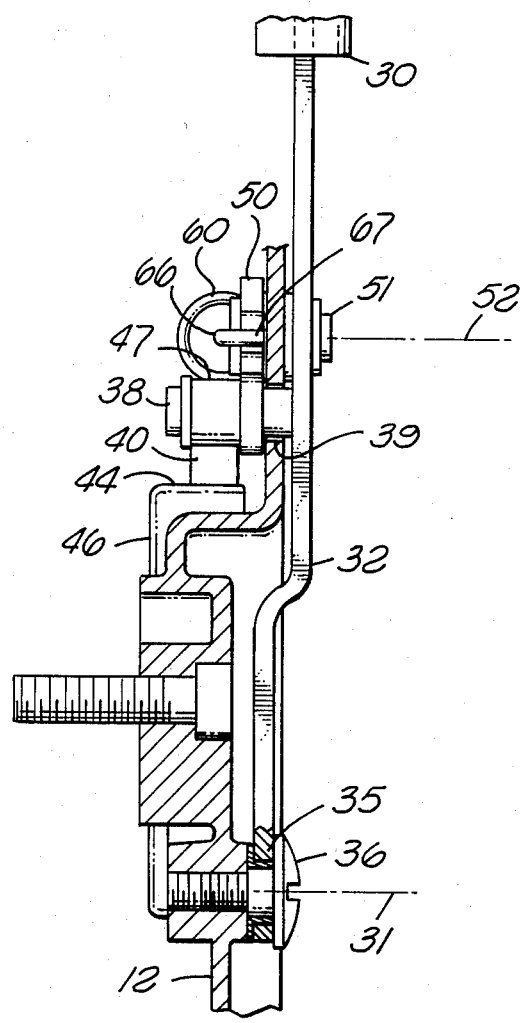

Illustrated in FIG. 3 is a side view of a safety braking system forming a part of the chain saw, with the braking system being in a non-braking position;

Illustrated in FIG. 4 is an end view of the safety braking system, viewed along line 4—4 shown in FIG. 1.

Figure 6:
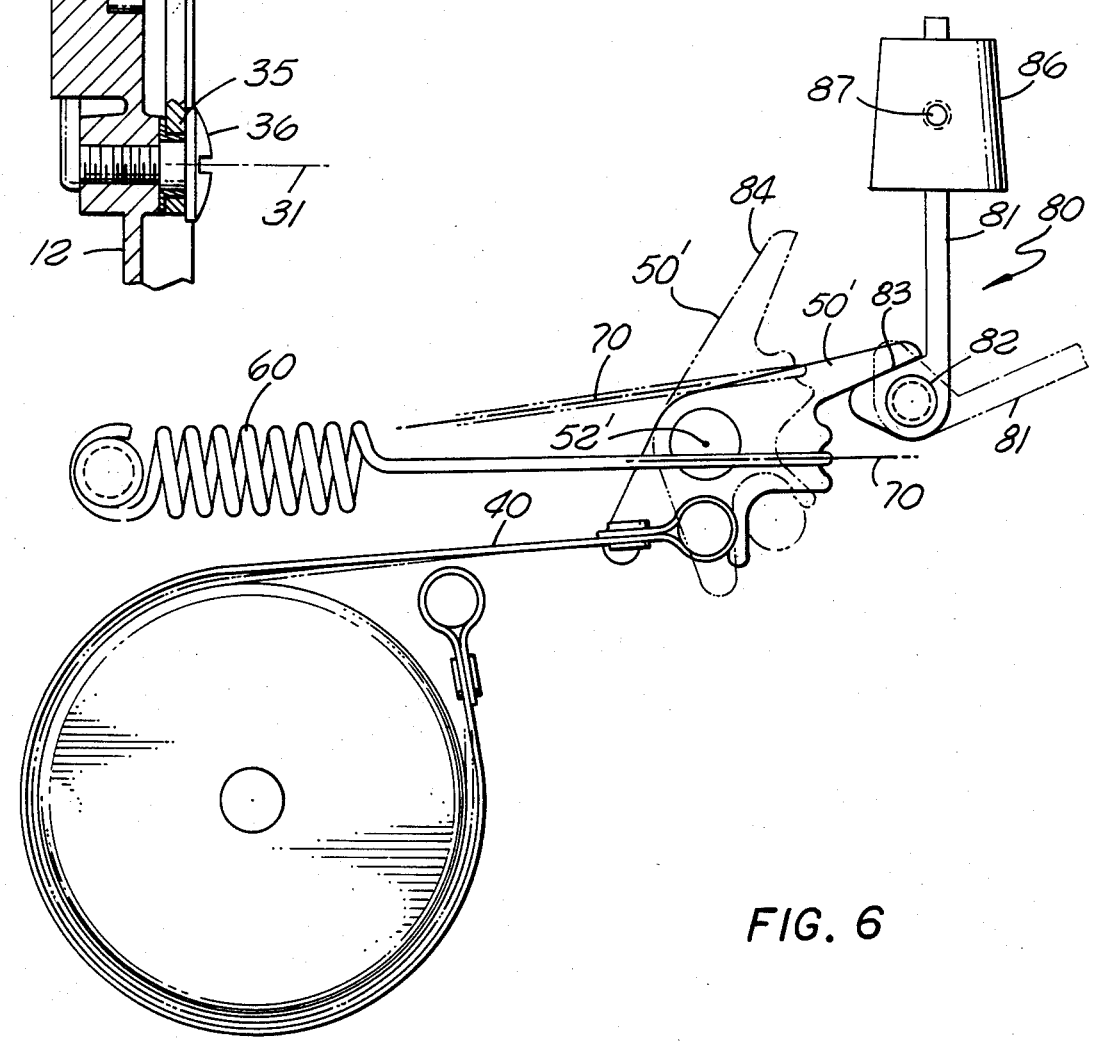
Figure 7:
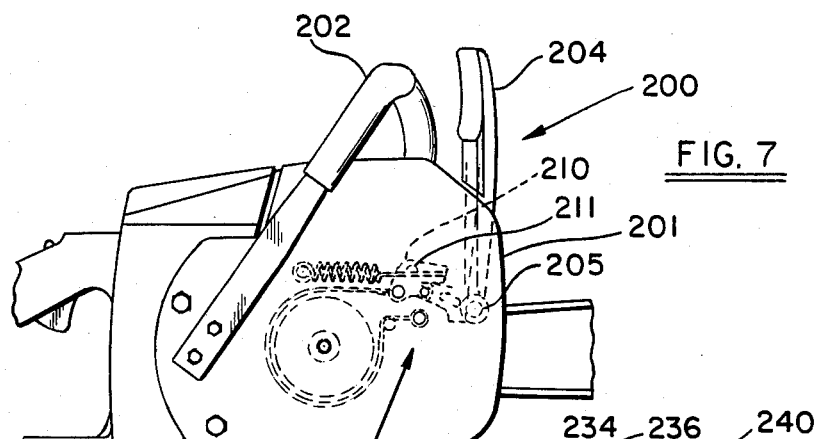

Illustrated in FIG. 5 is a view similar to FIG. 3 depicting the safety braking system in a braking position;

Illustrated in FIG. 6 is a view similar to FIG. 3 showing a second embodiment of the safety braking system in a both non-braking and braking position, Illustrated in FIG. 7 is a side elevation view of a portion of a chain saw showing a third embodiment of the present invention.

Figure 8:
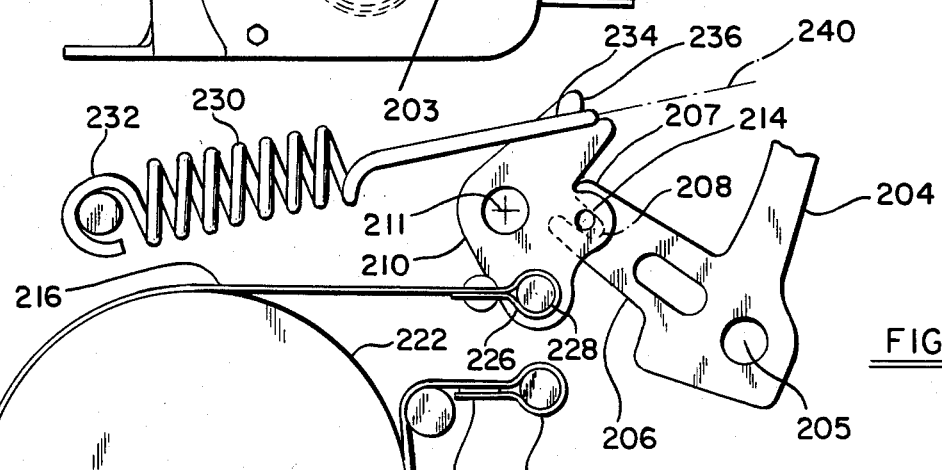
Figure 9:
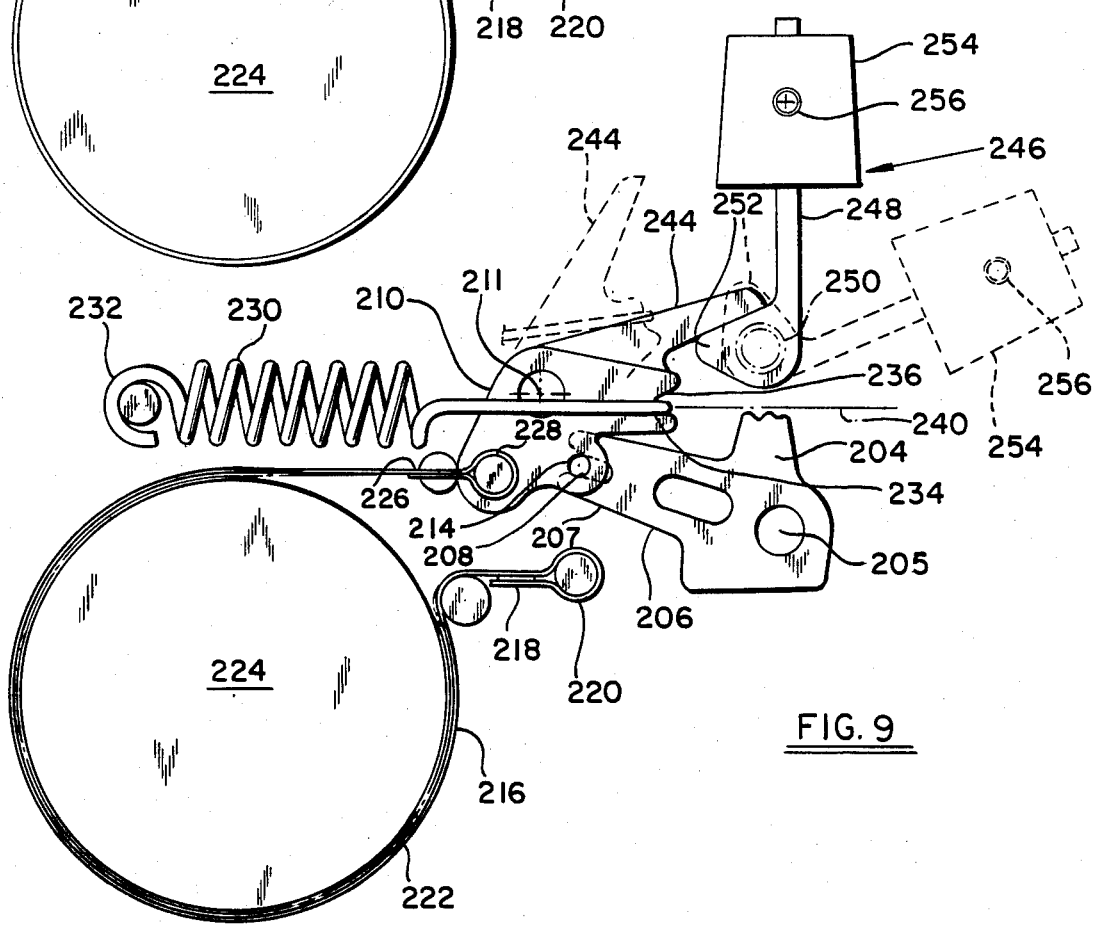

Illustrated in FIG. 8 is a side view of the safety braking system shown in FIG. 7 in the braking position; and Illustrated in FIG. 9 is a side view of the safety braking system shown in FIG. 7 illustrating a fourth embodiment of the present invention in both a non-braking and braking position.

DETAILED DESCRIPTION OF THE INVENTION

Figure 2:
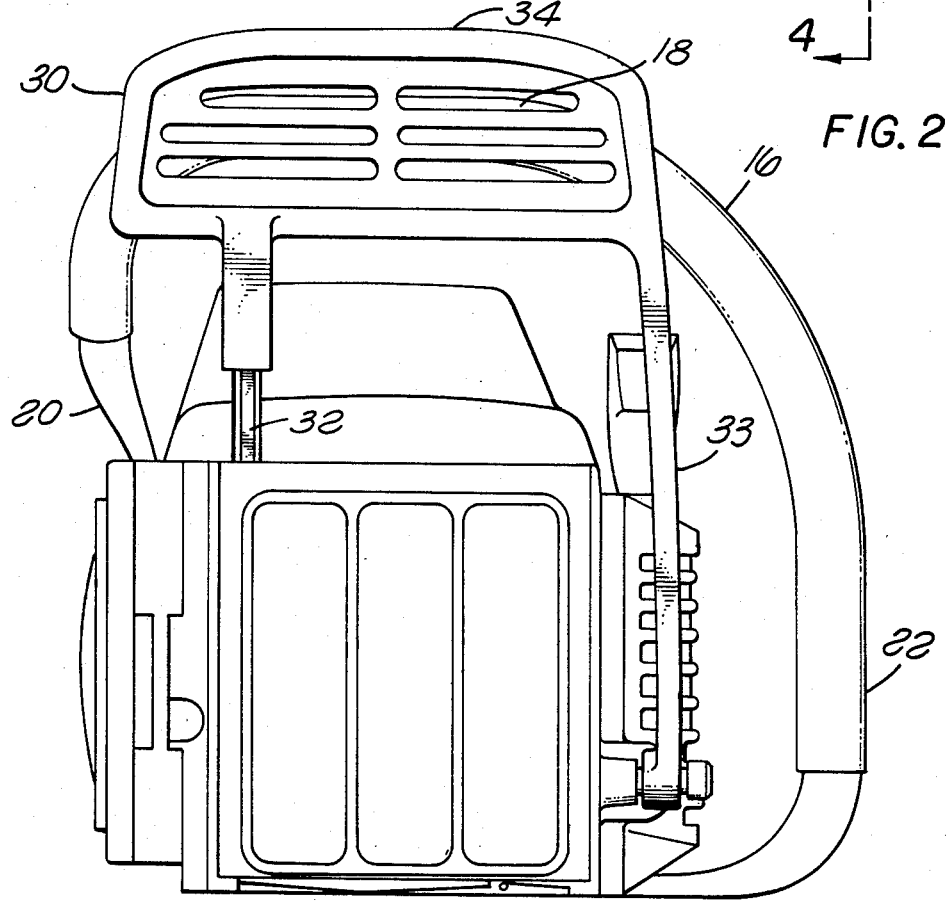

Illustrated in FIG. 1 is a side elevation view of a portable chain saw, while illustrated in FIG. 2 is a front view of the chain saw shown in FIG. 1. The chain saw 10 includes a housing 12 which carries an internal combustion engine or motor means (not shown) in a conventional fashion. The housing 12 includes a control handle 14 mounted at the rear of the housing and a gripping handle or means 16 mounted near the front of the housing. The gripping handle includes top and side portions 18, 20 and 22, respectively.

A guide bar or support means 24 projects forwardly from the housing 12 and supports a saw chain or cutting chain 26 for endless movement therearound. The cutter chain is driven by a suitable power transmission or rotation transmitting means from the internal combustion engine. The power transmission per se does not constitute a part of the present invention, hence any suitable conventional power transmission assembly may be utilized, such as those disclosed, for example, in U.S. Pat. No. 2,947,399, Centrifugally Activated Friction Clutch by H. E. Moore, and U.S. Pat. No. 3,385,411, Centrifugal Clutch Actuator And Spring Retainer by R. L. Collins.

Usually, the power transmission includes a chain sprocket wheel which is rotated by the engine drive shaft and around which is arranged the cutting chain 26. Rotation of the chain sprocket wheel drives the cutting chain in endless fashion around the guide bar 24.

During use of the chain saw 10 an operator grasps the control handle 14 with one hand and the gripping handle 16 with the other hand. The gripping handle 16 is primarily used to manipulate and apply pressure to the chain saw, while the control handle 14 is utilized to stabilize the saw and control the rate of travel of the cutting chain through operation of a trigger throttle 28. The operator is able to grasp various portions of the gripping handle 16 in order to properly orient the cutting chain.

As noted earlier, the "kickback" phenomenon can occur without warning. In order to minimize the effects of kickback the present invention involves the provision of a chain saw braking system.

In one preferred embodiment the safety braking system or means, generally designated by numeral 29, includes a sensing arm or means 30 which is pivotally mounted for swinging movement about an axis of rotation 31. The sensing arm is generally an inverted U-shaped member (see FIG. 2) having essentially vertically extending side sections 32, 33, and a horizontally extending top section 34. The side section 32 is pivotally mounted at end 35 to the housing 12 by a bolt 36 and pivots about axis 31. Thus the sensing arm is located in front of the gripping handle 16. The other side portion 33 is also pivotally mounted on the housing.

In short, the sensing arm 30 is arranged to lie between the gripping handle 16 and the cutting chain 26, to be engaged by an arm or hand of an operator. In any event, it will be appreciated that the sensing arm 30 is deployed to swing forwardly upon being struck by an operator's appendage.

Still referring to FIGS. 1 and 2, and additionally to FIGS. 3 and 4, it can be seen that the sensing arm 30 includes a protrusion in the form of a rigid pin 38 which extends through a notch 39 in housing 12.

The brake assembly 29 includes a flexible brake band 40 which is anchored at a first end 41 by a pin 42 attached to the housing 12. The brake band 40 is disposed about the peripheral surface 44 of a brake drum 46 and is attached at its second end 47 to the pin 38. The brake drum 46 comprises a rotary element that is coupled to the power transmission (not shown) of the chain saw such that braking forces which are applied to the drum will serve to slow the cutting chain. For example, the drum 46 can be coupled to a shaft 48 driven by the engine or to a sprocket wheel which drives the cutting chain. Alternatively, in those instances wherein centrifugal clutches are utilized, (such as are disclosed in the previously mentioned Moore et al and Collins Patents) the cup of the clutch may advantageously serve as the brake drum. In any event, as the chain saw engine and power transmission rotate the cutting chain, the drum 46 will also be rotated. Should a braking force be applied to the drum 46, such force will be transmitted in a manner to brake the cutting chain. It will be noted, however that the brake drum is, under normal operating conditions, free-turning and does not interfere with or place limitations upon the cutting chain power transmission.

A latch 50 is rotatably mounted to the housing 12 by means of a pin 51 and thus has an axis of rotation 52. The latch 50 is adapted to be engaged by sensing arm 30, which is accomplished by incorporating a notch 54 in the latch 50 positioned to engage the pin 38, (thus pin 38 acts as a latch engagement means for the sensing arm). Biasing means, in the form of a tension spring 60, is mounted at its first end 62 to the housing 12 by means of fastener 64 and by its second end 66 engaging a notch 67 on the latch 50.

Thus as illustrated in FIGS. 3 and 4, with the sensing arm 30 in the non-braking or first position, the pin 38 positions the latch 50 so that the force produced by the spring 60 lies along the force axis 70 (on the same side of the axis of rotation 52 as the pin 38). Thus the sensing arm 30 is yieldably held in the first position. The spring 60 will yieldably hold the sensing arm 30 in the first position as long as the force axis 70 of the spring remains on the same side of the axis of rotation 52 of the pin 51. Of course, the brake band 40 remains out of a frictional braking relationship with the brake drum 46.

FIG. 5, which is a view similar to FIG. 3, illustrates the sensing arm 30 in the second position or braking position. This will occur if the operator moves the sensing arm 30 due to his or her appendage striking the sensing arm during the previously discussed "kickback" phenomenon. When the sensing arm 30 is moved from the first position to the second or braking position the pin 38 attached thereto being in engagement with notch 54 of the latch 50 causes the latch to rotate (as shown in FIG. 5, in a counter-clock wise direction). As the pin 38 translates, the brake band 40 is brought into contact with the surface 44 of the brake drum 46 preventing the rotation of the drum and stopping the chain 26. Simultaneously, the latch 50 shifts to a position wherein the force axis 70 of the spring 60 is transferred to the opposite side of the axis of rotation 52 of the latch 50. In this position the spring 60 tends to yieldably hold the sensing arm 30 in the second position.

To reset the sensing arm 30 to the first position the operator need only apply a force to the sensing arm sufficient to overcome the force of the spring 60.

Although such a braking system 29 has many advantages, for example, low cost, high reliability, lightness in weight, and the capabilities to provide a yieldable holding force to maintain the sensing arm 30 when the safety arm is either in the first or second position, the safety characteristics of the braking system can be further improved by incorporating a second mechanism for braking the chain that does not require an appendage of the operator to strike the safety arm. As illustrated in FIG. 6 an acceleration sensing system, generally designated by numeral 80, can be provided which will sense the acceleration of the chain saw due to "kickback". The acceleration sensing system or acceleration sensor means 80 comprises a sensing bar 81 rotatably attached to the housing 12 by a fastener 82. The sensing bar 81 incorporates a cam surface 83. A latch 50' is provided with a lever arm 84 adapted to contact the cam surface 83. The sensing bar 81 is provided with a weight 86. While the weight 86 can be fixed in position for reasons that will be subsequently discussed, it may be desirable that it moveably engage the sensing arm 81 and be selectively fixable in a predetermined position on said sensing bar 81 by fastening means or set screw 87.

Thus, during "kickback" the bar 81 will resist the acceleration due to its inertia, which will cause the cam surface 83 to rotate relative to the chain saw. This will cause the latch 50' to rotate to a position where the spring 60's force axis 70 moves to the side opposite the axis of rotation 52', thus causing the spring 60 to yieldably hold the sensing arm 30 in the second position via the latch 50' and move the brake band 40 into contact with surface 44 of the brake drum 46. Thus, with incorporation of the acceleration sensing system 80, an appendage of the operator need not make contact with the sensing arm 30 to stop the chain. Furthermore by proper selection of the size of the weight 86 and its distance from the pivot point, the amount of "kickback" acceleration to be tolerated can be set at different values.

Illustrated in FIG. 7 is a side elevation view of a portion of a chain saw showing a third embodiment of the safety braking system. Referring to FIGS. 7 and 8, the chain saw is generally designated by numeral 200 and includes a housing 201 having a front gripping handle 202 and a brake assembly generally designated by numeral 203. The brake assembly 203 comprises a sensing arm 204 mounted on the housing 201 and rotatable about an axis of rotation 205 from a first position shown in FIG. 7 to a second position shown in FIG. 8. The sensing arm 204 incorporates another form of the protrusion described hereinabove, but in this embodiment taking the form of a member 206 having an end 207 with a first groove 208. The brake assembly 203 further includes another form of latch or lever 210 rotatably mounted to the housing 200 about axis of rotation 211. The lever 210 has a first pin 214 mounted thereto in engagement with first groove 208 on the member 206 of the sensing arm 204. A flexible brake band 216 is anchored at its first end 218 to a housing pin 220 mounted in the housing 201, it is disposed about the peripheral surface 222 of a brake drum 224 and is connected at its second 226 to a second pin 228 mounted on the lever 210.

A spring 230 is mounted at its first end 232 to housing 201 and at its second end to a second groove 236 on the lever 210. Thus, as in the previous case of the chain brake system 29 illustrated in FIGS. 1–6, when the sensing arm 204 moves from the first position or nonbraking position (FIG. 7) to the second position (FIG. 8), the groove 208 on member 206 rotates the lever 210 counterclockwise via first pin 214 causing the chain to stop. Meanwhile, this movement in turn causes the thrust axis 240 of the spring 30 to move from a position tending to hold the sensing arm in the first position and the brake band 216 free of peripheral surface 222 of brake drum 224, to a second position (shown in FIG. 8) when the thrust axis 240 of the spring 230 is on the opposite side of the axis of rotation 211 of the lever 210.

Thus, the spring 230 now tends to hold the sensing arm 204 in the second position and the brake band 216 into contact with the peripheral surface 222 of the drum 224.

A fourth embodiment of the present invention is shown in FIG. 9, where the lever 210 optionally incorporates a lever arm 244 in contact with an optional accelerating sensing system 246, which is similar to the accelerating sensing system 80 illustrated in FIG. 6, and operates in a similar fashion. Accelerating sensing system 246 includes a sensing bar 48 rotatably attached to housing 201 by a fastener 250. The bar 248 incorporates a cam surface 252, which contacts the lever arms 244. Sensing bar 248 is provided with a weight 254 movably engageable with the bar 248 and selectively fixable in place thereto by set screw 256. Thus, during "kickback" the bar 248 will resist the acceleration due to its inertia, which will cause the cam surface 252 to rotate relative to the chain saw. This will cause the lever 210 to rotate to a position where the force axis 240 of spring 230 moves to the side opposite the axis of rotation 211, thus causing the spring 230 to yieldably hold the sensing arm 204 in the second or braking position via the lever 210, and move the brake band 216 into contact with surface 222 of the brake drum 224. Thus, with incorporation of the acceleration sensing system 246, an appendage of the operator need not made contact with the sensing arm 204 to stop the chain. Again by proper selection of the size of the weight 254 and its distance from the pivot point, the amount of "kickback" acceleration to be tolerated can be set at different values.

While the safety brake system of the present invention has been described with reference to particular embodiments, it should be understood that the embodiments are merely illustrative as there are numerous variations and modifications which may be made by those skilled in the art. Thus the invention is to be construed as being limited only by the spirit and scope of the appended claims.

What is claimed:

1. In a chain saw having housing means, manual gripping handle means mounted on said housing means, motor means carried by said housing means, a cutting chain, support bar means projecting forwardly from said housing means for supporting said cutting chain for endless movement, rotation transmitting means drivingly connected to said motor means for driving said cutting chain, and safety braking means for stopping said cutting chain, said safety braking means comprising
   (a) sensing arm means, pivotally mounted on said housing means, for sensing the approach of an operator's limb to said cutting chain, said sensing arm means having a protrusion mounted thereon, a portion of said sensing arm means being located in front of said gripping handle means during operation of said chain saw and arranged to be moved from a first position to a second position;
   (b) a flexible brake band having a first end and a second end, said first end connected to said housing means and said second end connected to said protrusion in a manner such that when said sensing arm means moves from said first position to said second position said flexible band brake is moved from a position free of said rotation transmitting means to a frictional braking relationship with said rotation transmitting means;
   (c) a latch mounted on said housing means, said latch rotatable about an axis of rotation and receivingly engaging said protrusion of said sensing arm means, said latch adapted to be moved from a first latch position to a second latch position when said sensing arm means moves from said first position to said second position; and (d) biasing means having a first end and a second end, said first end connected to said housing means at a fixed point and said second end connected to said latch at a fixed point, for cooperation with said latch and said sensing arm means to yieldably urge aid sensing arm means to said first position when said sensing arm means is in said first position and to yieldably urge said sensing arm means to said second position when said sensing arm means is in said second position.

2. The chain saw of claim 1, wherein said second end of said biasing means is connected to said latch on the same side of said axis of rotation of said latch as said protrusion of said sensing arm means when said sensing arm means is in said first position, and on the opposite side of said axis of rotation when said sensing arm means is in said second position.

3. The chain saw of claim 1, wherein said protrusion comprises a pin on said sensing arm means and said latch includes a first groove receivable of said pin.

4. The chain saw of claim 3, wherein said second end of said flexible brake band is connected to said pin.

5. The chain saw of claim 4, wherein said latch includes a second groove engageable with said biasing means and said second end of said biasing means is connected to said latch by engagement with said second groove.

6. In a chain saw having housing means, manual gripping handle means mounted on said housing means, motor means carried by said housing means, a cutting chain, support bar means projecting forwardly from said housing means for supporting said cutting chain for endless movement, rotation transmitting means drivingly connected to said motor means for driving said cutting chain, safety braking means for stopping said cutting chain, and said safety braking means comprising:

(a) acceleration sensing means, mounted on said housing means, and having a cam, for sensing the acceleration of said chain saw, and for moving said cam from a first cam position to a second cam position when said acceleration rises above a predetermined value;

(b) a latch mounted on said housing means, said latch rotatable about an axis of rotation, said latch having a lever arm adapted to disengageably contact said cam, said latch further having a protrusion mounted thereon; said latch being arranged to move from a first position wherein said lever arm is in contact with said cam to a second position wherein said lever arm is disengaged from said cam when said cam is moved from said first cam position to said second cam position;

(c) a flexible brake band having a first end and a second end, said first end connected to said housing means and said second end connected to said protrusion in a manner such that when said cam moves from said first cam position to said second cam position, and hence said latch moves from said first position to said second position, said flexible brake band is moved from a position free of said rotation transmitting means to a frictional braking relationship with said rotation transmitting means; and (d) biasing means having a first end and a second end, said first end connected to said housing means and said second end connected to said latch, for yieldably urging said latch to said first position when said cam is in said first cam position, and for yieldably urging said latch to said second position when said cam is in said second position said second end of said biasing means is connected to said latch on the same side of said axis of rotation of said latch as said protrusion, and on the opposite side of said axis of rotation when said cam is in said second position.

7. The chain saw of claim 6, wherein said acceleration sensing means having a cam comprises an arm pivotally attached to said housing means having a cam attached thereto and a weight member mounted on said arm.

8. The chain saw of claim 7, wherein said weight member is movably mounted on said arm and further including fastening means for fixing said weight member in a predetermined position on said arm.

9. The chain saw of claim 6, wherein said protrusion comprises a pin on said latch and said second end of said flexible brake band is connected to said pin.

10. The chain saw of claim 6, wherein said latch includes a groove engageable with said biasing means and said second end of said biasing means is connected to said latch by engagement with said second groove.

11. In a chain saw having housing means, manual gripping handle means mounted on said housing means, motor means carried by said housing means, a cutting chain, support bar means projecting forwardly from said housing means for supporting said cutting chain for endless movement, rotation transmitting means drivingly connected to said motor means for driving said cutting chain, and safety braking means for stopping said cutting chain, said safety braking means comprising:

(a) sensing arm means, pivotally mounted on said housing means, for sensing the approach of an operator's limb to said cutting chain, said sensing arm means having a protrusion mounted thereon, said protrusion including a first groove, a portion of said sensing arm means being located in front of said gripping handle means during operation of said chain saw and arranged to be moved from a first position to a second position;

(b) a latch mounted on said housing means, said latch rotatable about an axis of rotation, said latch having a first pin and a second pin mounted thereon, said first pin being in engagement with said first groove, said latch being arranged to move from a first latch position to a second latch position when said sensing arm means is moved from said first position to said second position;

(c) a flexible brake band having a first end and a second end, said first end connected to said housing means and said second end connected to said second pin in a manner such that when said sensing arm means moves from said first position to said second position, and hence said latch moves from said first latch position to said second latch position, said flexible brake band is moved from a position free of said rotation transmitting means to a frictional braking relationship with said rotation transmitting means; and (d) biasing means having a first end and a second end, said first end connected to said housing means and said second end connected to said latch, for yieldably urging said latch to said first latch position when said sensing arm means is in said first position, and for yieldably urging said latch to said second latch position when said sensing arm means is in said second position, said biasing means connected to said latch on the same side of said axis of rotation of said latch as said second pin when said sensing arm means is in said first position, and on the opposite side of said axis of rotation when said sensing arm means is in said second position.

12. The chain saw of claim 11, wherein said latch includes a second groove engageable with said biasing means and said second end of said biasing means is connected to said latch by engagement said second groove.

13. In a chain saw having housing means, manual gripping handle means mounted on said housing means, motor means carried by said housing means, a cutting chain, support bar means projecting forwardly from said housing means for supporting said cutting chain for endless movement, rotation transmitting means drivingly connected to said motor means for driving said cutting chain, and safety braking means for stopping said cutting chain, said safety braking means comprising:
(a) acceleration sensing means, mounted on said housing means, and having a cam, for sensing the acceleration of said chain saw, and for moving said cam from a first cam position to a second cam position when said acceleration rises above a predetermined value;
(b) sensing arm means, pivotally mounted on said housing means, for sensing the approach of an operator's limb to said cutting chain, said sensing arm means having a protrusion mounted thereon, said protrusion including a first groove, a portion of said sensing arm means being located in front of said gripping handle means during operation of said chain saw and arranged to be moved from a first position to a second position;
(c) a latch mounted on said housing means, said latch rotatable about an axis of rotation, said latch having a first pin and a second pin mounted thereon, said first pin being in engagement with said first groove, said latch further having a lever arm adapted to disengagingly contact said cam, said latch being arranged to move from a first latch position wherein said lever arm is in contact with said cam to a second latch position wherein said lever arm is disengaged from said cam when said cam is moved from said first cam position to said second cam position and said sensing arm means is moved from said first position to said second position;
(d) a flexible brake band having a first end and a second end, said first end connected to said housing means and said second end connected to said second pin in a manner such that when said latch moves from said first latch position to said second latch position said flexible brake band is moved from a position free of said rotation transmitting means to a frictional braking relationship with said transmitting means; and
(e) biasing means having a first end and a second end, said first end connected to said housing means and said second end connected to said latch, for yieldingly urging said latch to said first latch position when said sensing arm means is in said first position and said cam is in said first cam position, and for yieldingly urging said latch to said second latch position when said sensing arm means is in said second position and said cam is in said second cam position.

14. The chain saw of claim 13, wherein said second end of said biasing means is connected to said latch on the same side of said axis of rotation of said latch as said second pin when said latch is in said first latch position, and on the opposite side of said axis of rotation when said latch is in said second latch position.

15. The chain saw of claim 13, wherein said latch includes a second groove engageable with said biasing means and said second end of said biasing means is connected to said latch by engagement with said second groove.

16. The chain saw of claim 13, wherein said acceleration sensing means having a cam comprises an arm pivotally attached to said housing means having a cam attached thereto and a weight member mounted on said arm.

17. The chain saw of claim 16, wherein said weight member is movably mounted on said arm and further including fastening means for fixing said weight member in a predetermined position on said arm.

18. In a chain saw having housing means, manual gripping handle means mounted on said housing means, motor means carried by said housing means, a cutting chain, support bar means projecting forwardly from said housing means for supporting said cutting chain for endless movement, rotation transmitting means drivingly connected to said motor means for driving said cutting chain, and safety braking means for stopping said cutting chain, said safety braking means comprising:
(a) sensing arm means, pivotally mounted on said housing means, for sensing the approach of an operator's limb to said cutting chain, said sensing arm means having a protrusion mounted thereon, a portion of said sensing arm means being located in front of said gripping handle means during operation of said chain saw and arranged to be moved from a first position to a second position;
(b) acceleration sensing means, mounted on said housing means, and having a cam, for sensing the acceleration of said chain saw, and for moving said cam from a first cam position to a second cam position when said acceleration rises above a predetermined value;
(c) a flexible band brake having a first end and a second end, said first end connected to said housing means and said second end connected to said protrusion in a manner such that when said sensing arm means moves from said first position to said second position said flexible band brake is moved from a position free of said rotation transmitting means to a frictional braking relationship with said rotation transmitting means;
(d) a latch mounted on said housing means, said latch rotatable about an axis of rotation and receivingly engaging said protrusion of said sensing arm means, said latch further having a lever arm adapted to disengagingly contact said cam, said latch being arranged to move from a first latch position wherein said lever arm is in contact with said cam to a second latch position wherein said lever arm is disengaged from said cam when said cam is moved from said first cam position to said second cam position and said sensing arm means is moved from said first position to said second position; and (e) biasing means having a first end and a second end, said first end connected to said housing means and said second end connected to said latch, for yieldably urging said sensing arm means to said first position when said sensing arm means is in said first position, and for yieldably urging said sensing arm means to said second position when said sensing arm means is in said second position.

19. A chain saw as claimed in claim 18, wherein said second end of said biasing means is connected to said latch on the same side of said axis of rotation of said latch as said protrusion of said sensing arm means when said sensing arm means is in said first position, and on the opposite side of said axis of rotation when said sensing arm means is in said second position.

20. A chain saw as claimed in claim 18, wherein said protrusion comprises a pin on said sensing arm means and said latch includes a first groove receivable of said pin.

21. A chain saw as claimed in claim 20, wherein said second end of said flexible brake band is connected to said pin.

22. A chain saw as claimed in claim 21, wherein said latch includes a second groove engageable with said biasing means and said second end of said biasing means is connected to said latch by engagement with said second groove.

23. In a chain saw having housing means, manual gripping handle means mounted on said housing means, motor means carried by said housing means, a cutting chain, support bar means projecting forwardly from said housing means for supporting said cutting chain for endless rotation thereabout, rotation transmitting means drivingly connected to said motor means for driving said cutting chain, and safety braking means for stopping said cutting chain upon occurrence of kickback, said safety braking means comprising:
a pivotable sensing means pivotally attached to said housing means, for sensing kickback of said chain saw, second sensing means pivoting from a first position to a second position upon detection of kickback;
brake means, engageable of said rotation transmitting means, for preventing rotation transmission from said motor means to said cutting chain, said brake means movable from a position free of said rotation transmitting means to a position of frictional braking engagement with said rotation transmitting means to prevent rotation of said cutter chain;
a discrete pivotable member, pivotable about a pivot point from a first pivotable member position to a second pivotable member position;
biasing means having a first end and a second end, said first end engaging said housing means at a fixed point and said second end engaging said pivotable member at a fixed point removed from said pivot point, for yieldably urging said pivotable member to said first position when said pivotable member is in said first position and for yieldably urging said pivotable member to said second position when said pivotable member is in said second position, an imaginary line connecting the fixed point of engagement of said biasing means with said housing means and the fixed point of engagement of said biasing means with said pivotable member lying on one side of said pivot point when said pivotable member is in said first pivotable member position and on the opposite side of said pivot point when said pivotable member is in said second pivotable member position;
said pivotable sensing means, said discrete pivotable member and said biasing means cooperating with said brake means to hold said brake means in a position free of said rotation transmitting means during operation of the chain saw when said sensing means is in said first position and said pivotable member is in said first pivotable member position, and upon occurrence of kickback said sensing means cooperating with said pivotable member to move said pivotable member from said first pivotable member position to said second pivotable member position when said sensing means moves from said first position to said second position, said pivotable sensing means, said discrete pivotable member and said biasing means then cooperating with said brake means to hold said brake means in a position of frictional braking engagement with said rotation transmitting means to prevent rotation of said cutter chain.

24. A chain saw as claimed in claim 22, wherein said pivotable sensing means comprises sensing arm means, pivotally mounted on said housing means, for sensing the approach of an operator's limb to said cutting chain, a portion of said sensing arm means being located in front of said gripping handle means during operation of said chain saw and arranged to be moved from a first sensing arm position to a second sensing arm position, said sensing arm means cooperating with said pivotable member to move said pivotable member from said first pivotable member position to said second pivotable member when said sensing arm means moves from said first sensing arm position to said second sensing arm position.

25. A chain saw as claimed in claim 22, wherein said pivotable sensing means comprises:
(a) acceleration sensing means, pivotally mounted on said housing means, and having a cam, for sensing the acceleration of said chain saw, and for moving said cam from a first cam position to a second cam position when said acceleration rises above a predetermined value, and
(b) sensing arm means, pivotally mounted on said housing means, for sensing the approach of an operator's limb to said cutting chain, a portion of said sensing arm means being located in front of said gripping handle means during operation of said chain saw and arranged to be moved from a first sensing arm position to a second sensing arm position when an operator's limb approaches said cutting chain, said sensing arm means cooperating with said pivotable member to move said pivotable member from said first pivotable member position to said second pivotable member position when said sensing arm means moves from said first sensing arm position to said second sensing arm position;
and said pivotable member has a surface adapted to disengagingly contact said cam, said pivotable member being arranged to move from said first pivotable member position wherein said surface is in contact with said cam to a second pivotable member position wherein said surface is disengaged from said cam when said cam is moved from said first cam position to said second cam position.

26. A chain saw as claimed in claim 25, wherein said acceleration sensing means having a cam comprises an arm pivotally attached to said housing means having a cam attached thereto and a weight member mounted on said arm.

27. A chain saw as claimed in claim 26, wherein said weight member is movably mounted on said arm and further including fastening means for fixing said weight member in a predetermined position on said arm.

28. A chain saw as claimed in claim 22, wherein said brake means comprises a flexible brake band having a first end and a second end, said first end connected to said housing means and said second end movable from a first brake end position wherein said flexible brake band is in a position free of said rotation transmitting means to a second brake end position wherein said flexible brake band is in a position of frictional braking engagement with said rotation transmitting means.

29. A chain saw as claimed in claim 28, wherein said second end is connected to said sensing means.

30. A chain saw as claimed in claim 28, wherein said second end is connected to said pivotable member.

* * * * *

UNITED STATES PATENT AND TRADEMARK OFFICE
CERTIFICATE OF CORRECTION

PATENT NO. : 4,553,326

DATED : November 19, 1985

INVENTOR(S) : JAMES F. WEST

It is certified that error appears in the above-identified patent and that said Letters Patent is hereby corrected as shown below:

Column 14, line 22, please delete "22" and substitute therefor --23--.

Column 14, line 36, please delete "22" and substitute therefor --23--.

Column 15, line 8, please delete "22" and substitute therefor --23--.

Signed and Sealed this

Seventeenth Day of August, 1993

Attest:

BRUCE LEHMAN

*Attesting Officer*    Commissioner of Patents and Trademarks